US009048752B2

(12) United States Patent
Capilla et al.

(10) Patent No.: US 9,048,752 B2
(45) Date of Patent: Jun. 2, 2015

(54) OFF-LINE POWER CONVERTER AND INTEGRATED CIRCUIT SUITABLE FOR USE IN SAME

(71) Applicants: Jose M. Capilla, Tournefeuille (FR); Joel Turchi, Gagnac sur Garonne (FR)

(72) Inventors: Jose M. Capilla, Tournefeuille (FR); Joel Turchi, Gagnac sur Garonne (FR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 338 days.

(21) Appl. No.: 13/628,390

(22) Filed: Sep. 27, 2012

(65) Prior Publication Data
US 2014/0085947 A1 Mar. 27, 2014

(51) Int. Cl.
*H02M 7/515* (2007.01)
*H02M 1/42* (2007.01)
*H02M 1/00* (2006.01)

(52) U.S. Cl.
CPC .... *H02M 1/4225* (2013.01); *H02M 2001/0032* (2013.01); *Y02B 70/126* (2013.01); *Y02B 70/16* (2013.01)

(58) Field of Classification Search
USPC ............. 363/21.02–21.18, 49, 52, 53, 84, 86, 363/89, 90, 125–127
See application file for complete search history.

(56) References Cited

U.S. PATENT DOCUMENTS 5,867,379 A * 2/1999 Maksimovic et al. .......... 363/89
5,892,355 A    4/1999 Pansier et al.
6,320,765 B2 * 11/2001 Yasumura ................... 363/21.02
6,801,027 B2 * 10/2004 Hann et al. ..................... 323/282
7,733,678 B1 *  6/2010 Notohamiprodjo et al. ..... 363/89
7,990,740 B1 *  8/2011 Notohamiprodjo et al. ..... 363/59
8,174,855 B2 *  5/2012 Ribarich et al. ................ 363/89
2008/0266909 A1 * 10/2008 Tabaian et al. ............. 363/21.06

OTHER PUBLICATIONS

Cirrus Logic, Inc.; "Digital PFC Controller for Electronic Ballasts"; Product Data Sheet CS1601 and CS1601H; Feb. 2012; 16 pages; DS931F3; Cirrus Logic, Inc., 800 West 6th Street, Austin, Texas 78701 United States.
Renesas Technology Corp.; "Critical Conduction Mode PFC Control IC"; Product Data Sheet R2A20113DD/SP; Oct. 10, 2008; 7 pages; REJ03F0279-0100, Rev. 1.00; Renesas Technology Corp., Sales Strategic Planning Div., Nippon Bldg., 2-6-2, Ohte-machi, Chiyoda-ku, Tokyo 100-0004, Japan.

(Continued)

*Primary Examiner* — Adolf Berhane
*Assistant Examiner* — Nusrat Quddus
(74) *Attorney, Agent, or Firm* — Polansky & Associates, P.L.L.C.; Paul J. Polansky (57) ABSTRACT

An off-line power converter includes an integrated circuit power factor controller including a multi-function input terminal, a drive terminal for providing a drive signal to a gate of a drive transistor, a processing circuit coupled to the multi-function input terminal and, based on a signal received from the multi-function input terminal, providing at least one current signal representative of a current conducted in the off-line power converter, and at least one voltage signal representative of a voltage provided to a load, and a controller for providing the drive signal selectively in response to the at least one current signal and the at least one voltage signal.

20 Claims, 5 Drawing Sheets

(56) References Cited

OTHER PUBLICATIONS

Semiconductor Components Industries, LLC; "Enhanced, High-Efficiency Power Factor Controller"; Product Data Sheet NCP1611; Dec. 2011; 28 pages; NCP1611/D, Rev. 1; Semiconductor Components Industries, LLC, P.O. Box 5163, Denver, Colorado 80217 United States.

Semiconductor Components Industries, LLC; "Power Factor Correction (PFC) Handbook"; Product Handbook; Feb. 2011; 130 pages; HBD853/D, Rev. 4; Semiconductor Components Industries, LLC, P.O. Box 5163, Denver, Colorado 80217 United States.

\* cited by examiner

OFF-LINE POWER CONVERTER AND INTEGRATED CIRCUIT SUITABLE FOR USE IN SAME

FIELD OF THE DISCLOSURE

The present disclosure relates generally to power converters, and more particularly relates to a control circuit for a power converter.

BACKGROUND

An off-line power converter can be implemented using an integrated circuit power factor controller to provide power factor correction to off-line appliances. Power factor correction helps to boost the efficiency of power transfer to the load and to reduce electromagnetic interference (EMI). The integrated circuit drives power factor correction stages and can operate in a critical conduction mode to provide light load operation control and other useful control and safety features. However it would be desirable to decrease the cost of off-line power converters while retaining the power factor correction and safety features of existing designs.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items.

DETAILED DESCRIPTION

Figure 1:
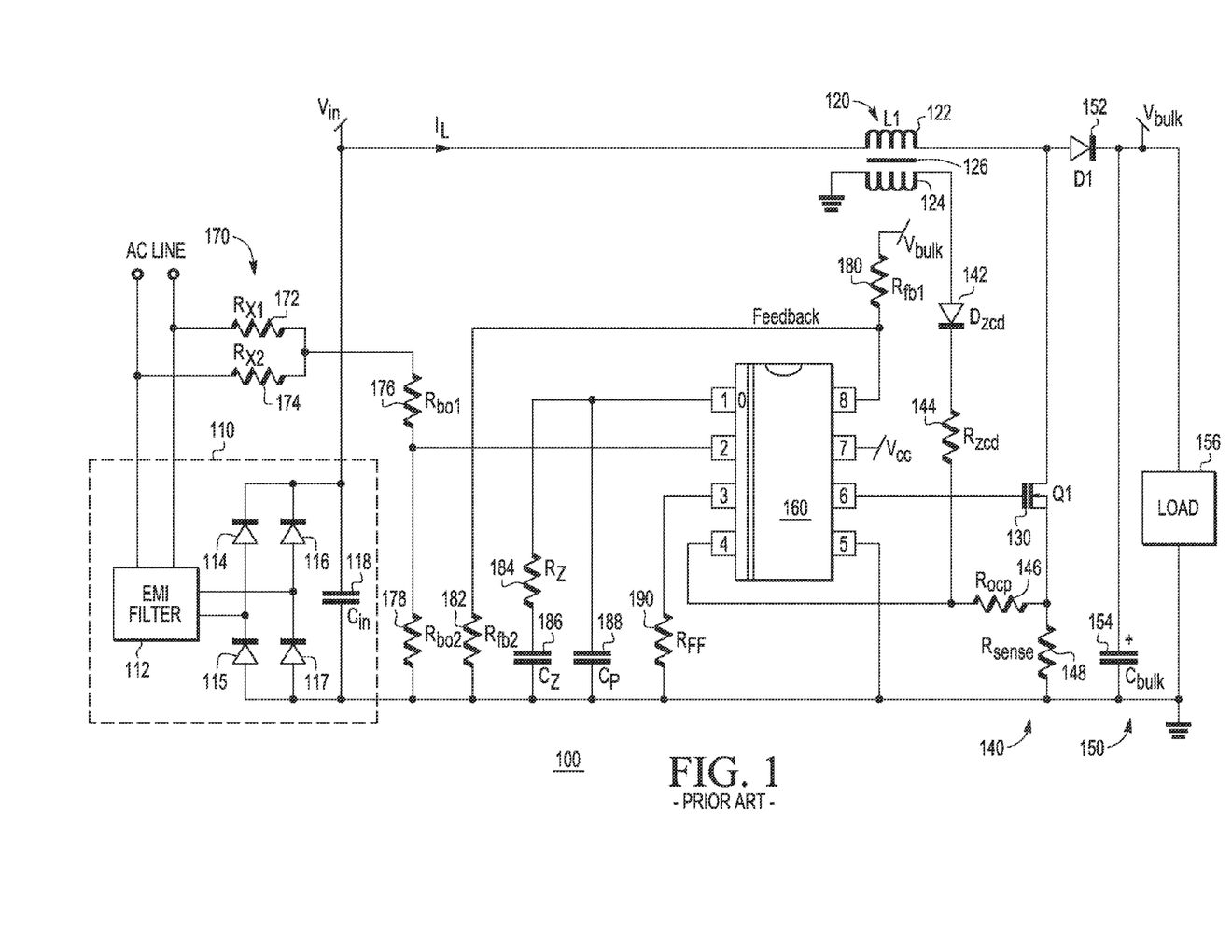
FIG. 1 illustrates in partial block diagram and partial schematic form an off-line power converter including an integrated circuit power factor controller known in the prior art.

FIG. 1 illustrates in partial block diagram and partial schematic form an off-line power converter 100 including an 8-pin integrated circuit power factor controller 160 known in the prior art. Off-line power converter 100 generally includes a rectifier 110, a transformer 120, a drive transistor 130 labeled "Q1", a sensing circuit 140, an output circuit 150, integrated circuit power factor controller 160, a line sensing circuit 170, a resistor 180 labeled "$R_{fb1}$", a resistor 182 labeled "$R_{fb2}$", a resistor 184 labeled "$R_Z$", a capacitor 186 labeled "$C_Z$", a capacitor 188 labeled "$C_p$", and a resistor 190 labeled "$R_{FF}$".

Rectifier 110 includes an electromagnetic interference ("EMI") filter 112, a diode 114, a diode 115, a diode 116, a diode 117, and a capacitor 118 labeled "$C_{in}$". Rectifier 110 has an input terminal connected to a first "AC line" power supply terminal, an input terminal connected to a second AC line power supply terminal, an output terminal to provide a first power supply terminal, and an output terminal connected to ground, which serves as a reference voltage terminal for off-line power converter 100. Diode 114 has an anode connected to the first power supply terminal provided by EMI filter 112, and a cathode to provide a voltage labeled "$V_{in}$". Diode 115 has an anode connected to ground, and a cathode connected to the anode of diode 114. Diode 116 has an anode connected to the second power supply terminal provided by EMI filter 112, and a cathode connected to the cathode of diode 114. Diode 117 has an anode connected to ground, and a cathode connected to the anode of diode 116. Capacitor 118 has a first terminal connected to the cathode of diode 116, and a second terminal connected to ground.

Transformer 120 includes a primary winding 122 labeled "L1", a secondary winding 124, and a transformer core 126. Primary winding 122 has a first terminal to receive $V_{in}$, and a second terminal. Secondary winding 124 has a first terminal connected to ground, and a second terminal.

Drive transistor 130 has a gate electrode, a drain electrode connected to the second terminal of primary winding 122, a source electrode, and a substrate electrode connected to the source electrode.

Sensing circuit 140 includes a diode 142 labeled "$D_{zcd}$", a resistor 144 labeled "$R_{zcd}$", a resistor 146 labeled "$R_{ocp}$", and a resistor 148 labeled "$R_{sense}$". Diode 142 has an anode connected to the second terminal of secondary winding 124, and a cathode. Resistor 144 has a first terminal connected to the cathode of diode 142, and a second terminal. Resistor 146 has a first terminal connected to the second terminal of resistor 144, and a second terminal connected to the source electrode of drive transistor 130. Resistor 148 has a first terminal connected to the second terminal of resistor 146, and a second terminal connected to ground.

Output circuit 150 includes a diode 152 labeled "D1", a bulk capacitor 154 labeled "$C_{bulk}$", and a load 156. Diode 152 has an anode connected to the drain electrode of drive transistor 130, and a cathode to provide a voltage labeled "$V_{bulk}$". Bulk capacitor 154 has a first terminal connected to the cathode of diode 152, and a second terminal connected to ground. Load 156 has a first terminal connected to the first terminal of bulk capacitor 154, and a second terminal connected to ground.

Integrated circuit power factor controller 160 has a first terminal, a second terminal, a third terminal, a fourth terminal connected to the first terminal of resistor 146, a fifth terminal connected to ground, a sixth terminal connected to the gate electrode of drive transistor 130, a seventh terminal to receive a power supply voltage labeled "$V_{CC}$", and an eighth terminal to receive a signal labeled "Feedback".

Line sensing circuit 170 includes a resistor 172 labeled "$R_{X1}$", a resistor 174 labeled "$R_{X2}$", a resistor 176 labeled "$R_{bo1}$", and a resistor 178 labeled "$R_{bo2}$". Resistor 172 has a first terminal connected to the first AC line power supply terminal, and a second terminal. Resistor 174 has a first terminal connected to the second AC line power supply terminal, and a second terminal connected to the second terminal of resistor 172. Resistor 176 has a first terminal connected to the second terminal of resistor 174, and a second terminal connected to the second terminal of integrated circuit power factor controller 160. Resistor 178 has a first terminal connected to the second terminal of resistor 176, and a second terminal connected to ground.

Resistor 180 has a first terminal to receive $V_{bulk}$, and a second terminal to provide the Feedback signal. Resistor 182 has a first terminal connected to the eighth terminal of integrated circuit power factor controller 160, and a second terminal connected to ground. Resistor 184 has a first terminal connected to the first terminal of integrated circuit power factor controller 160, and a second terminal. Capacitor 186 has a first terminal connected to the second terminal of resistor 184, and a second terminal connected to ground. Capacitor 188 has a first terminal connected to the first terminal of resistor 184, and a second terminal connected to ground. Resistor 190 has a first terminal connected to the third terminal of integrated circuit power factor controller 160, and a second terminal connected to ground.

In operation, rectifier 110 provides a full-wave rectified voltage Vin with filtering between the power supply mains (AC line), and downstream circuitry of off-line power converter 100. In particular, rectifier 110 manages the propagation of unwanted energy from the AC line to downstream circuits by passing the signals through EMI filter 112. EMI filter 112 filters EMI interference so that downstream circuits are not disturbed during operation. EMI filter 112 receives the AC line signal and provides a filtered AC signal to its output terminals. Diodes 114, 115, 116 and 117 provide a rectified input voltage $V_{in}$, stored and filtered across capacitor 118, to the downstream circuits of off-line power converter 100.

For transformer 120, a varying alternating current through primary winding 122 creates a varying magnetic flux in transformer core 126 of transformer 120 that results in a varying alternating voltage across primary winding 122. By inductive coupling, the varying magnetic flux creates a varying magnetic field in the coils of secondary winding 124. As is known, the voltage induced in secondary winding 124 is a mathematical function of the voltage across primary winding 122 and is defined by the ratio of the number of turns in secondary winding 124 to the number of turns in primary winding 122.

During an on time ("$T_{ON}$"), integrated circuit power factor controller 160 pulls up terminal 6 to provide a positive drive voltage on the gate electrode of drive transistor 130, which is an N-channel metal oxide semiconductor field effect transistor ("MOSFET"). Drive transistor 130 transitions to the "on state" and provides a low impedance current path to ground at the second terminal of primary winding 122. Rectifier 110 provides $I_L$, and $I_L$ flows through primary winding 122, drive transistor 130, and resistor 148. Drive transistor 130 operates to lower the drain electrode voltage towards ground, and transformer 120 builds its magnetic field and stores energy as a function of $I_L$.

Resistor 148 senses the current flowing through drive transistor 130 and provides a voltage level to terminal 4 of integrated circuit power factor controller 160. Resistor 148 provides a positive voltage to terminal 4 as a function of the current flowing from the drain electrode to the source electrode of drive transistor 130. If the voltage on terminal 4 exceeds a threshold, integrated circuit power factor controller 160 determines that drive transistor 130 is operating in an over current condition, and deactivates drive transistor 130.

During an off ("$T_{OFF}$") time, integrated circuit power factor controller 160 pulls down terminal 6 to make drive transistor 130 nonconductive. Drive transistor 130 transitions to the "off state" and provides a high impedance current path at the second terminal of primary winding 122. In response, primary winding 122 resists the changing $I_L$, and operates to raise the voltage at the second terminal of primary winding 122. Diode 152 turns on as a function of the voltage provided by primary winding 122 to provide $I_L$ to output circuit 150 and to increase $V_{bulk}$. Bulk capacitor 154 stores $V_{bulk}$ across load 156 as a function of $I_L$, and filters high frequency voltage transitions across load 156.

Also, secondary winding 124 operates to raise the voltage on the anode of diode 142 of sensing circuit 140. Diode 142 turns on and enables current flow through resistors 144, 146, and 148 in response to the voltage induced in secondary winding 124. Sensing circuit 140 provides a voltage to terminal 4 of integrated circuit power factor controller 160 to indicate when the magnetic field of secondary winding 124 is in a "demagnetization" phase by detecting when secondary winding 124 is providing zero current, known as zero current detection ("ZCD"). As a function of the voltage on terminal 4, if integrated circuit power factor controller 160 detects ZCD, integrated circuit power factor controller 160 adjusts the operation of certain internal circuits. Secondary winding 124 and diode 142 operate to prevent interference between OCP detection, when drive transistor 130 is in the on state, and ZCD detection, when drive transistor 130 is in the off state.

Line sensing circuit 170 senses the instantaneous voltage of the AC line by dividing the AC line voltage as a function of the values of resistors 172, 174, 176, and 178. The second terminal of resistor 176 forms a voltage at terminal 2 of integrated circuit power factor controller 160. If the voltage on terminal 2 is less than a threshold, integrated circuit power factor controller 160 detects a brown-out condition and stops operation to prevent excessive stress.

Off-line power converter 100 provides $V_{bulk}$ to the first terminal of resistor 180 to provide the Feedback signal as a function of the values of resistors 180 and 182. The second terminal of resistor 180 forms a voltage at terminal 8 of integrated circuit power factor controller 160. As a function of the voltage on terminal 8, integrated circuit power factor controller 160 regulates the duty cycle of drive transistor 130 and disables it immediately if the output voltage is too high.

Integrated circuit power factor controller 160 provides a signal from the output of an internal error amplifier implemented as an operational transconductance amplifier used in the voltage regulation loop to terminal 1. A circuit network formed by resistor 184, capacitor 186, and capacitor 188 and connected to terminal 1 adjusts the regulation loop bandwidth and phase margin.

Integrated circuit power factor controller 160 provides an output voltage at terminal 3 to resistor 190 to form a voltage as a function of the current provided by the AC line. As a function of the voltage on terminal 3, integrated circuit power factor controller 160 adjusts the dead time and initiates cycle skipping.

Off-line power converter 100 provides power factor control using an 8-pin integrated circuit power factor controller 160 along with various safety and protection features during circuit operation. However it would be desirable to decrease the cost of off-line power factor converter 100 while retaining all of its safety and protection features.

Figure 2:
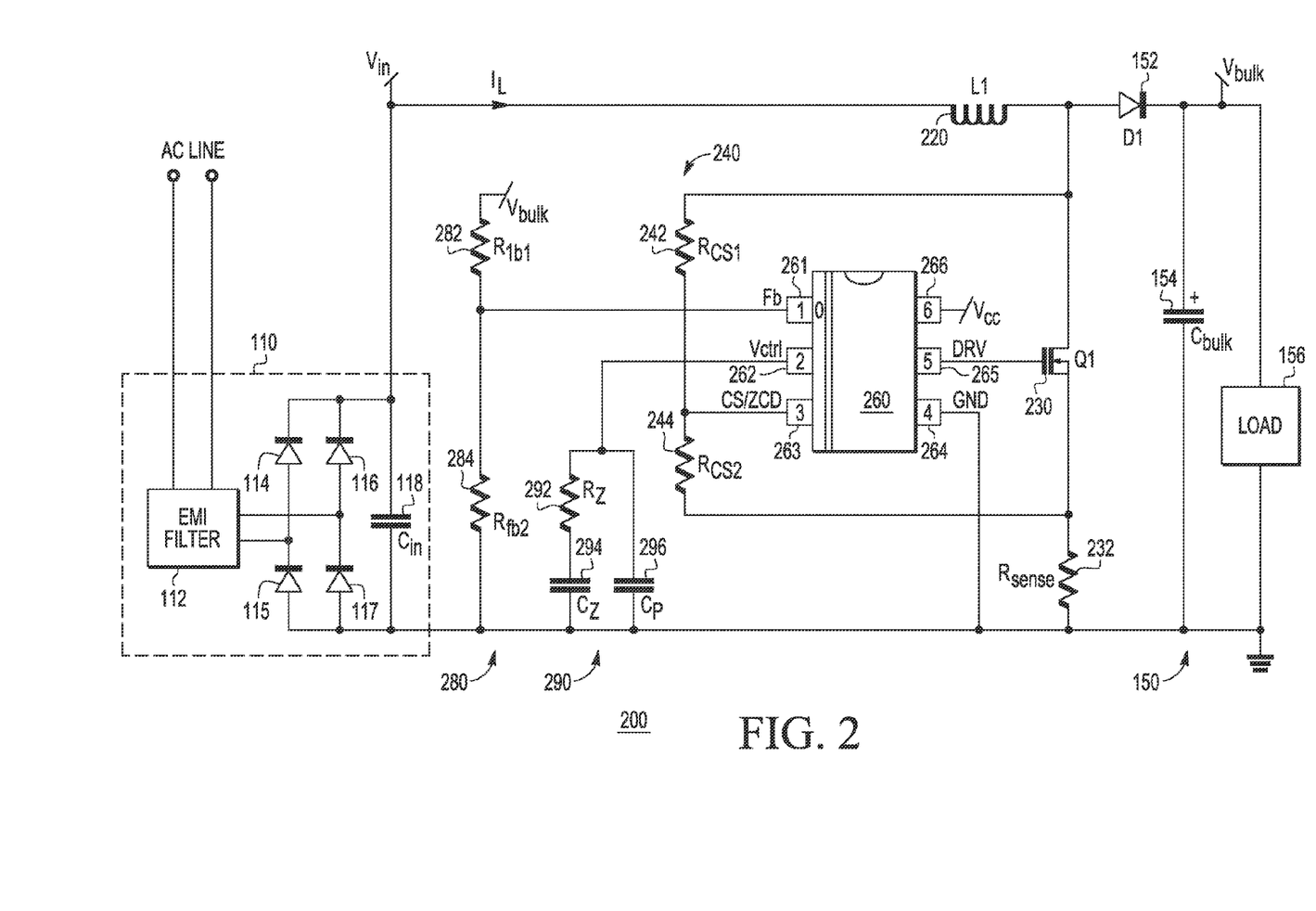
FIG. 2 illustrates in partial block diagram and partial schematic form an off-line power converter, including an integrated circuit power factor controller, according to one embodiment of the present invention.

FIG. 2 illustrates in partial block diagram and partial schematic form an off-line power converter 200 with an integrated circuit power factor controller 260 according to one embodiment of the present invention. Off-line power converter 200 generally includes rectifier 110 and output circuit 150 as illustrated above, an inductor 220 labeled "L1", a drive transistor 230 labeled "Q1", a sense resistor 232 labeled "$R_{sense}$", a voltage sensing circuit 240, integrated circuit power factor controller 260, a feedback circuit 280, and a compensation network 290.

Inductor 220 has a first terminal to receive $V_{in}$, and a second terminal connected to the anode of diode 152.

Drive transistor 230 has a gate electrode to receive a signal labeled "DRV", a drain electrode connected to the second terminal of inductor 220, a source electrode, and a substrate electrode connected to the source electrode. Sense resistor 232 has a first terminal connected to the source electrode of drive transistor 230, and a second terminal connected to ground.

Voltage sensing circuit 240 includes a resistor 242 labeled "$R_{CS1}$", and a resistor 244 labeled "$R_{CS2}$". Resistor 242 has a first terminal connected to the drain electrode of drive transistor 230, and a second terminal to provide a signal labeled "CS/ZCD". Resistor 244 has a first terminal connected to the second terminal of resistor 242, and a second terminal connected to the source of drive transistor 230.

Integrated circuit power factor controller 260 has a first terminal 261 to receive a signal labeled "Fb", a second terminal 262 to provide a signal labeled "Vctrl", a third terminal 263 to receive CS/ZCD, a fourth terminal 264 connected to ground, a fifth terminal 265 connected to the gate electrode of drive transistor 230, and a sixth terminal 266 for receiving a power supply voltage labeled "Vcc".

Feedback circuit 280 includes a resistor 282 labeled "$R_{fb1}$", and a resistor 284 labeled "$R_{fb2}$". Resistor 282 has a first terminal connected to $V_{bulk}$, and a second terminal connected to feedback terminal 261 of integrated circuit power factor controller 260. Resistor 284 has a first terminal connected to the second terminal of resistor 282, and a second terminal connected to ground.

Compensation network 290 includes a resistor 292 labeled "Rz", a capacitor 294 labeled "$C_z$", and a capacitor 296 labeled "$C_p$". Resistor 292 has a first terminal connected to terminal 262 of integrated circuit power factor controller 260, and a second terminal. Capacitor 294 has a first terminal connected to the second terminal of resistor 292, and a second terminal connected to ground. Capacitor 296 has a first terminal connected to the first terminal of resistor 292, and a second terminal connected to ground.

In operation, for inductor 220, a varying alternating current creates a varying magnetic flux that results in a varying alternating voltage across inductor 220. During $T_{ON}$, integrated circuit power factor controller 260 provides a positive drive voltage on the gate electrode of drive transistor 230. Drive transistor 230 transitions to the on state and provides a low impedance current path at the second terminal of inductor 220. Rectifier 110 provides $I_L$ that flows through inductor 220, drive transistor 230, and sense resistor 232. Drive transistor 230 operates to lower the drain electrode voltage towards ground, and inductor 220 builds its magnetic field and stores energy as a function of $I_L$.

During $T_{ON}$, sense resistor 232 provides a voltage on its first terminal proportional to the current flowing through drive transistor 230. When integrated circuit power factor controller 260 activates signal DRV, the drain-to-source voltage of drive transistor 230 is small and the voltage drop across voltage sense circuit 240 is also small. Thus the voltage on multi-function input terminal 263 is substantially equal to the voltage on the first terminal of sense resistor 232 and multi-function input terminal 263 can be used to sense the current flowing through drive transistor 230. Internal processing circuitry compares the voltage of multi-function input terminal 263 to an overcurrent protection threshold. If the voltage of multi-function input terminal 263 exceeds this threshold, integrated circuit power factor controller 260 deactivates signal DRV.

During $T_{OFF}$, integrated circuit power factor controller 260 makes drive transistor 230 substantially nonconductive. Drive transistor 230 transitions to the off state and provides a high impedance current path at the second terminal of inductor 220. In response, inductor 220 resists the changing $I_L$, and operates to raise the voltage at the second terminal of inductor 220. Diode 152 turns on as a function of the voltage provided by the second terminal of inductor 220 to provide $I_L$ to output circuit 150. Bulk capacitor 154 stores charge to smooth the $V_{bulk}$ across load 156 and filters high frequency voltage transitions across load 156.

Multi-function input terminal 263 operates as a multi-function input terminal to sense a variety of voltages and currents, including $I_L$, $V_{drain}$, average $V_{in}$, and $V_{bulk}$. Integrated circuit power factor controller 260 uses these voltages and currents to detect several conditions including overcurrent, demagnetization phase, brownout, and overvoltage, and to adjust its operation accordingly. By using multi-function input terminal 263 as a multi-function terminal, integrated circuit power factor controller 260 can be implemented with a reduced pin count and can use a simple inductor rather than a more-expensive transformer. Thus, off-line power converter 200 has significantly reduced cost compared to off-line power converter 100.

Feedback circuit 280 receives $V_{bulk}$ and provides a fraction of $V_{bulk}$ to feedback terminal 261 determined by the values of resistors 282 and 284. Integrated circuit power factor controller 260 uses the voltage on feedback terminal 261 to regulate the duty cycle of DRV. In addition, it compares the voltage at feedback terminal 261 to a threshold. If the voltage at feedback terminal 261 goes above this threshold, integrated circuit power factor controller 260 detects an overvoltage condition and immediately deactivates the DRV signal. In this way, integrated circuit power factor controller 260 provides redundant OVP using two different terminals. Since it can still detect overvoltage even in the case of a fault in one of the circuit elements, it improves safety.

Integrated circuit power factor controller 260 uses the Fb signal and an internal error amplifier to regulate the duty cycle of the DRV signal. It provides the error amplifier output on terminal 262, and the circuit arrangement of resistor 292, capacitor 294, and capacitor 296 adjusts the regulation loop bandwidth.

Off-line power converter 200 provides efficient power factor control using a 6-pin integrated circuit. At the same time, it improves the safety by adding redundant overvoltage detection while retaining the protection features of offline power converter 100. Also, off-line power converter 200 provides several current and voltage sensing features using a single multi-function pin; replaces transformer 120 with a less expensive, more reliable inductor 220; and provides safer, redundant methods for sensing and processing $V_{bulk}$, average $V_{in}$, $I_L$, and detecting brown out, overcurrent, and overvoltage conditions and demagnetization phase.

Figure 3:
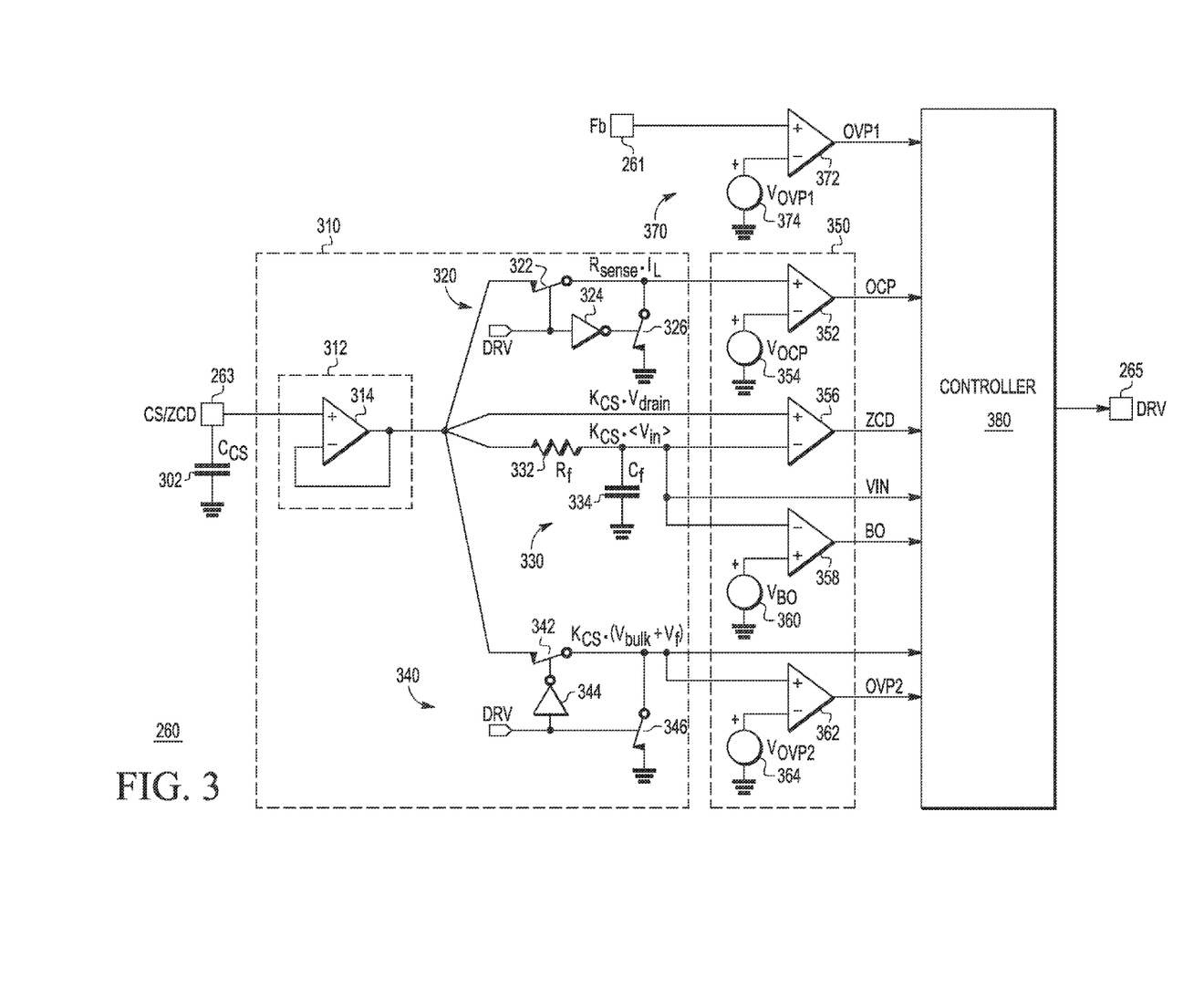
FIG. 3 illustrates in partial block diagram and partial schematic form the integrated circuit power factor controller, of FIG. 2.

FIG. 3 illustrates in partial block diagram and partial schematic form integrated circuit power factor controller 260 of FIG. 2. Integrated circuit power factor controller 260 generally includes a conditioning circuit 310, an evaluation circuit 350, an overvoltage protection circuit 370, and a controller 380. Conditioning circuit 310 and evaluation circuit 350 operate together to form a processing circuit for integrated circuit power factor controller 260.

Off-line power converter 200 also includes a capacitor 302 labeled "$C_{CS}$" as shown in FIG. 3. Capacitor 302 has a first terminal connected to multi-function input terminal 263 of integrated circuit power factor controller 260, and a second terminal connected to ground.

Conditioning circuit 310 includes a buffer 312, a switch circuit 320, a resistor capacitor ("RC") circuit 330, and a switch circuit 340. Buffer 312 includes an OPAMP 314 having a positive input connected to the first terminal of capacitor 302, a negative input, and an output connected to the negative input to provide a signal labeled "$K_{CS} \cdot V_{drain}$". Switch circuit 320 includes a switch 322, an inverter 324, and a switch 326.

Switch 322 has an enable input to receive DRV, a first terminal connected to the output of OPAMP 314, and a second terminal to provide a signal labeled "$R_{sense} \cdot I_L$". Inverter 324 has an input connected to the enable input of switch 322, and an output. Switch 326 has an enable input connected to the output of inverter 324, a first terminal connected to the second terminal of switch 322, and a second terminal connected to ground. RC circuit 330 includes a resistor 332 labeled "$R_f$", and a capacitor 334 labeled "$C_f$". Resistor 332 has a first terminal connected to the output of OPAMP 314, and a second terminal to provide a signal labeled "$K_{CS} \cdot \langle V_{in} \rangle$". Capacitor 334 has a first terminal connected to the second terminal of resistor 332, and a second terminal connected to ground. Switch circuit 340 includes a switch 342, an inverter 344, and a switch 346. Switch 342 has an enable input, a first terminal connected to the output of OPAMP 314, and a second terminal to provide a signal labeled "$K_{CS} \cdot (V_{OUT} + V_f)$". Inverter 344 has an input to receive DRV, and an output connected to the enable input of switch 342. Switch 346 has an enable input to receive the DRV signal, a first terminal connected to the second terminal of switch 342, and a second terminal connected to ground.

Evaluation circuit 350 includes a comparator 352, a reference voltage generator 354, a comparator 356, a comparator 358, a reference voltage generator 360, a comparator 362, and a reference voltage generator 364. Comparator 352 has a positive input connected to the first terminal of switch 326, a negative input, and an output to provide a signal labeled "OCP". Reference voltage generator 354 has a positive terminal connected to the negative input of comparator 352 to provide a reference voltage labeled "$V_{OCP}$", and a negative terminal connected to ground. Comparator 356 has a positive input connected to the output of OPAMP 314, a negative input connected to the first terminal of capacitor 334, and an output to provide a signal labeled "ZCD". Comparator 358 has a positive input, a negative input connected to the second terminal of resistor 332, and an output to provide a signal labeled "BO". Reference voltage generator 360 has a positive terminal connected to the positive input of comparator 358 to provide a reference voltage labeled "$V_{BO}$", and a negative terminal connected to ground. Comparator 362 has a positive input connected to the first terminal of switch 346, a negative input, and an output to provide a signal labeled "OVP2". Reference voltage generator 364 has a positive terminal connected to the negative input of comparator 362 to provide a reference voltage labeled "$V_{OVP2}$", and a negative terminal connected to ground.

Overvoltage protection circuit 370 includes a comparator 372 and a reference voltage generator 374. Comparator 372 has a positive input connected to feedback terminal 261 of integrated circuit power factor controller 260, a negative input, and an output to provide a signal labeled "OVP1". Reference voltage generator 374 has a positive terminal connected to the negative input of comparator 372 to provide a reference voltage labeled "$V_{OVP1}$", and a negative terminal connected to ground.

Controller 380 has an input connected to the output of comparator 352, an input connected to the output of comparator 356, an input connected to the negative input of comparator 356, an input connected to the output of comparator 358, an input connected to the first terminal of switch 346, an input connected to the output of comparator 362, an input connected to the output of comparator 372, and an output connected to drive terminal 265.

In operation, during $T_{OFF}$, voltage sensing circuit 240 provides a fraction labeled "$K_{CS}$" of the drain electrode voltage, "$V_{drain}$", of drive transistor 230 to multi-function input terminal 263. During $T_{ON}$, voltage sensing circuit 240 provides the voltage at the first terminal of sense resistor 232 to multi-function input terminal 263 to represent the current conducted through drive transistor 230.

Voltage sensing circuit 240 supports the use of multi-function input terminal 263 because it forms a voltage that represents both a current conducted in off-line power converter 200 when DRV is active, and a voltage provided to load 156 when DRV is inactive. Buffer 312 drives internal circuits while providing a high impedance to multi-function input terminal 263, and conditioning circuit 310 extracts several pieces of information from the signals provided by buffer 312. Also, conditioning circuit 310 provides several signals of interest to evaluation circuit 350, including a voltage proportional to $I_L$ via switch circuit 320, a voltage proportional to the average value of $V_{in}$ via RC circuit 330, and a voltage proportional to the output voltage via switch circuit 340. When DRV is active, switch circuit 320 connects the signal from multi-function input terminal 263 to an input terminal of comparator 352. Evaluation circuit 350 operates using a set of comparators and reference voltage generators to provide a multiple number of functional inputs to controller 380. Controller 380 further processes the functional inputs to determine, for example, the switching period, slew rate, turn on time, and turn off time, of DRV.

In particular, conditioning circuit 310 provides a signal proportional to $I_L$ when DRV is active using the relation $V_{263} = R_{sense} \cdot I_L$, in which $V_{263}$ is equal to the voltage on multi-function input terminal 263. Comparator 352 compares this voltage to $V_{OCP}$, and if it is greater than $V_{OCP}$, provides signal OCP to controller 380.

Buffer 312 provides a voltage equal to $K_{CS} \cdot V_{drain}$ to the positive input of comparator 356, where $K_{CS}$ is equal to $R_{CS2}/(R_{CS1} + R_{CS2})$. RC circuit 330 provides a voltage equal to $K_{CS} \cdot \langle V_{in} \rangle$, where "$\langle V_{in} \rangle$" is an average $V_{in}$, to the negative input of comparator 356. Comparator 356 compares the voltages to each other, and when the instantaneous drain voltage of drive transistor 230 exceeds the average voltage, comparator 352 senses the demagnetization phase and provides signal ZCD to controller 380. Also, for demagnetization processing, RC circuit 330 provides the representative voltage function "$K_{CS} \cdot \langle V_{in} \rangle$", directly to controller 380 as representative of "VIN", where VIN is a time averaged function of "$V_{263}(t) = V_{263(2)}(t) = K_{263} \cdot V_{drain}(t)$". Comparator 358 compares $V_{BO}$ to $K_{CS} \cdot \langle V_{in} \rangle$, and if $V_{BO}$ is greater than $K_{CS} \cdot \langle V_{in} \rangle$, comparator 352 provides BO to controller 380.

Comparators 362 and 372 provide redundant OVP based on separate OVP1 and OVP2 signals. Conditioning circuit 310 determines $V_{bulk}$ based on the relation $V_{drain} = V_{bulk} + V_F$, in which $V_F$ is the forward biased cut-in voltage of diode 152. Switch 340 provides this voltage to comparator 362. Comparator 362 compares this voltage to $V_{OVP2}$, and provides OVP2 to controller 380 if it is greater than $V_{OVP2}$. Comparators 362 and 372 provide separate OVP signals, OVP1 and OVP2, based on signals received from separate pins. Feedback circuit 280 provides the Fb signal to comparator 372, which provides signal OVP1 to controller 380 if Fb is greater than $V_{OVP1}$.

Integrated circuit power factor controller 260 provides a processing circuit to form several current and voltage sensing signals using the voltage on a single multi-function pin. It uses these signals to provide a drive signal to the gate of a drive transistor to control the power factor of the off-line power converter while retaining the safety and protection features of existing designs.

Figure 4:
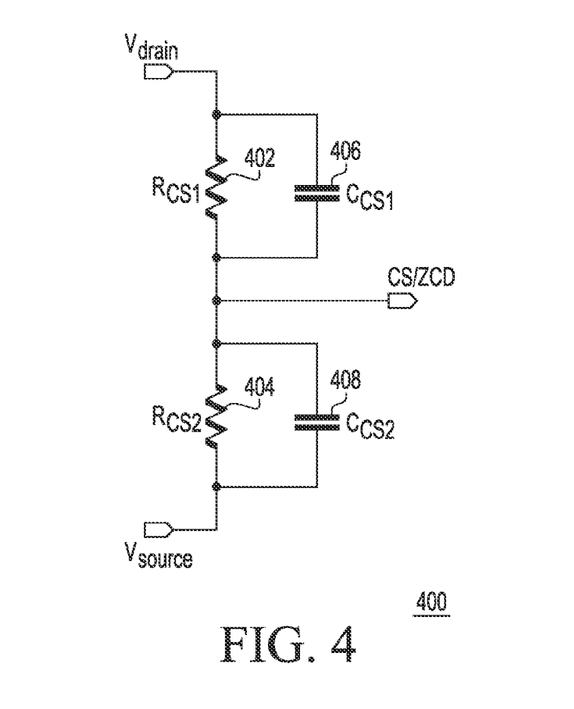
FIG. 4 illustrates in schematic form a voltage sensing according to an alternate embodiment of the voltage sensing circuit of FIG. 2.

FIG. 4 illustrates in schematic form a voltage sensing circuit 400 according to an alternate embodiment of voltage sensing circuit 240 of FIG. 2. Voltage sensing circuit 400 generally includes a resistor 402 labeled "$R_{CS1}$", a capacitor 406 labeled "$C_{CS1}$", a resistor 404 labeled "$R_{CS2}$", and a capacitor 408 labeled "$C_{CS2}$". Resistor 402 has a first terminal to receive a voltage labeled "$V_{drain}$", and a second terminal to provide signal CS/ZCD. Resistor 404 has a first terminal connected to the second terminal of resistor 402, and a second terminal to receive a voltage labeled "$V_{source}$". Capacitor 406 has a first terminal connected to the first terminal of resistor 402, and a second terminal connected to the first terminal of resistor 404. Capacitor 408 has a first terminal connected to the second terminal of capacitor 406, and a second terminal connected to the second terminal of resistor 404.

In operation, the voltage divider ratio of capacitors 406 and 408 is matched to the voltage divider ratio of resistors 402 and 404, respectively. Capacitors 406 and 408 provide higher bandwidth and less sensitivity to parasitic capacitances between multi-function input terminal 263 and ground.

Figure 5:
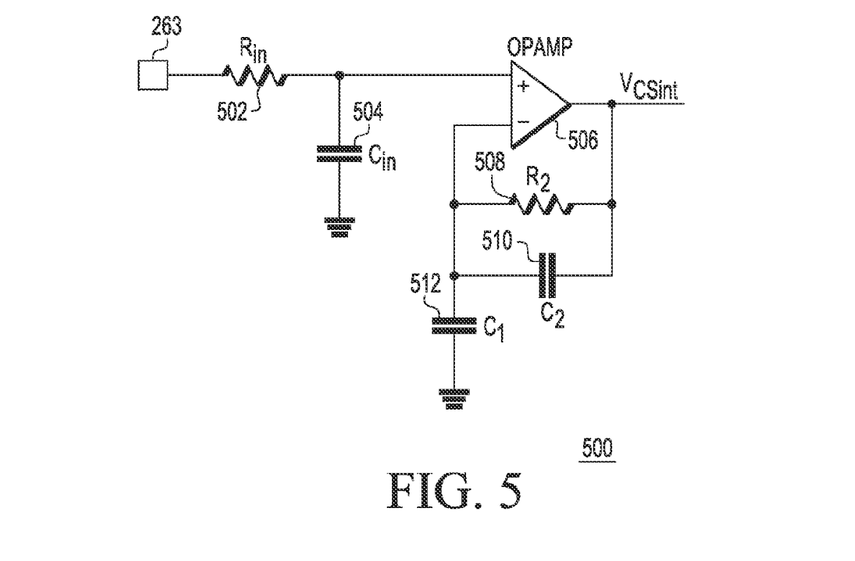
FIG. 5 illustrates in schematic form an a buffer circuit according to an alternate embodiment of the buffer of FIG. 3.

FIG. 5 illustrates in schematic form a buffer 500 according to an alternate embodiment of buffer 312 of FIG. 3. Buffer 500 generally includes a resistor 502 labeled "$R_{in}$", a capacitor 504 labeled "$C_{in}$", an OPAMP 506, a resistor 508 labeled "$R_2$", a capacitor 510 labeled "$C_2$", and a capacitor 512 labeled "$C_1$". Resistor 502 has a first terminal connected to multi-function input terminal 263 of integrated circuit power factor controller 260, and a second terminal. Capacitor 504 has a first terminal connected to the second terminal of resistor 502, and a second terminal connected to ground. OPAMP 506 has a positive input connected to the first terminal of capacitor 504, a negative input, and an output to provide a signal labeled "$VCS_{int}$". Resistor 508 has a first terminal connected to the output of OPAMP 506, and a second terminal connected to the negative input of OPAMP 506. Capacitor 510 has a first terminal connected to the first terminal of resistor 508, and a second terminal connected to the second terminal of resistor 508. Capacitor 512 has a first terminal connected to the second terminal of capacitor 510, and a second terminal connected to ground.

In operation, when considering a mathematical complex plane analysis, voltage sensing circuit 240 provides a delayed voltage as a function of capacitor 302 to OPAMP 506 with a "pole" frequency defined as:

$$f_{p0} = \frac{1}{2\pi * (R242||R244) * C302}$$

Buffer 500 feeds its output node through an RC network back to its negative input. Voltage sensing circuit 240 may provide the function $V_{drain}$ or may provide the function $V_{source}$, to the positive terminal of buffer circuit 500. Buffer 500 operates to perform a cancellation of the pole at frequency $f_{p0}$ by placing a "zero" at a frequency defined as:

$$f_{z1} = \frac{1}{2\pi * R508 * (C512 + C510)}$$

Buffer 500 provides further compensation by providing a function of $f_{p1}$ and/or a function of $f_{p2}$, so that buffer 500 only amplifies desired frequencies of the signal received from multi-function input terminal 263.

Figure 6:
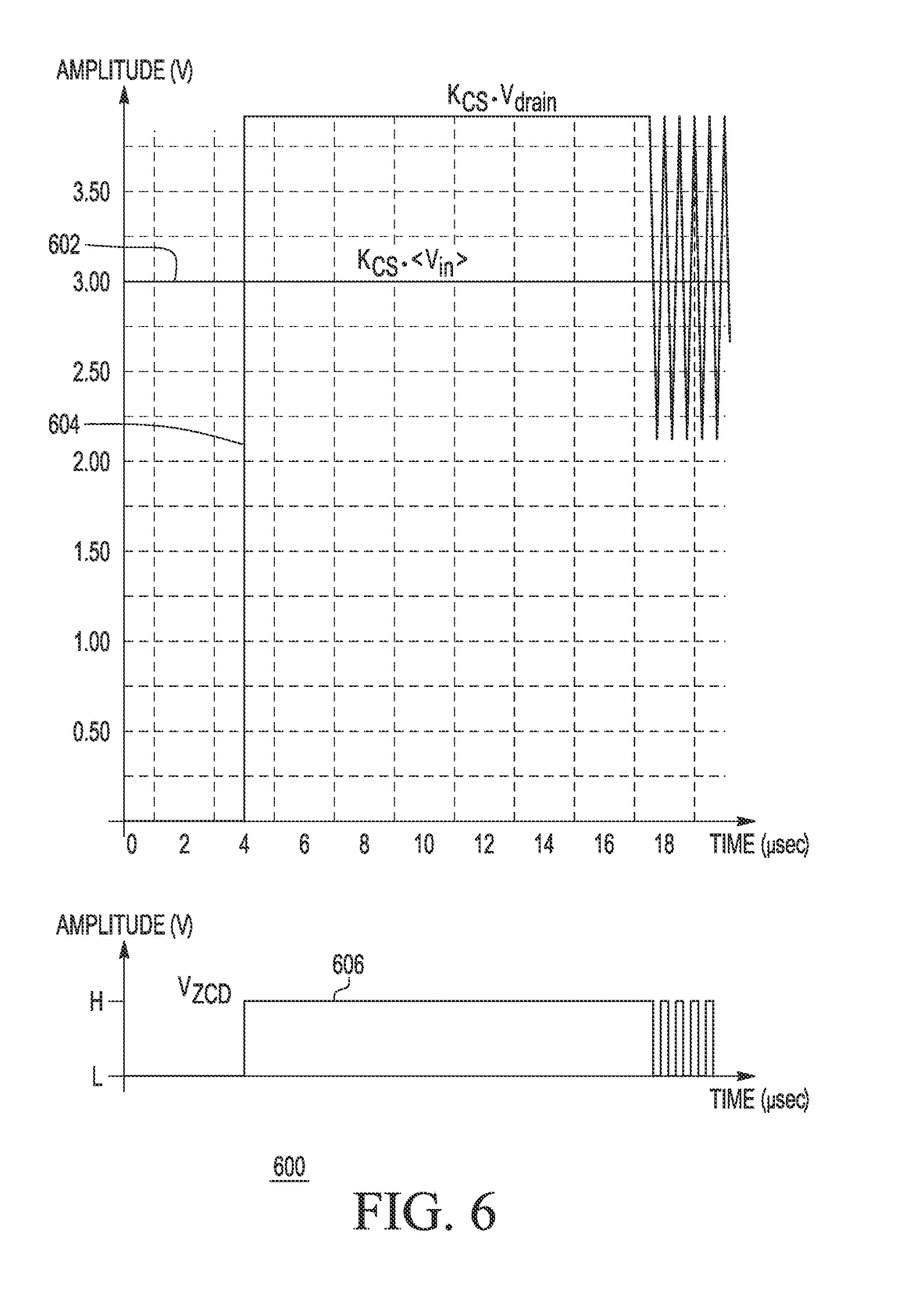
FIG. 6 illustrates two timing diagrams useful in understanding the operation of the off-line power converter of FIG. 2.

FIG. 6 illustrates two timing diagrams 600 useful in understanding the operation of off-line power converter 200 of FIG. 2. For the upper timing diagram, the horizontal axis represents time in microseconds (μsec), and the vertical axis represents amplitude in volts (V). The upper timing diagram illustrates two waveforms of interest, a waveform 602 labeled "$K_{CS}·<V_{in}>$", and a waveform 604 labeled "$K_{CS}·V_{drain}$". For the lower timing diagram, the horizontal axis represents time in μsec, and the vertical axis represents amplitude in volts. The lower timing diagram illustrates a waveform 606 labeled "$V_{ZCD}$". For the upper and lower timing diagrams, the horizontal axis illustrates two particular time periods of interest, including a first time period from about 0 μsec to about 4 μsec when drive transistor 230 is in the on state, and a second time period from about 4 μsec to about 20 μsec when drive transistor 230 is in the off state.

In operation, for first timing diagram and second timing diagram 600, at about 4 μsec, integrated circuit power factor controller 260 pulls down drive terminal 265 to make drive transistor 230 nonconductive. Drive transistor 230 transitions to the off state and provides a high impedance current path at the second terminal of inductor 220. In response, inductor 220 resists the changing $I_L$, and operates to raise the voltage at the second terminal of inductor 220. When the instantaneous voltage $K_{CS}·V_{drain}$ is greater than the average voltage $K_{CS}·<V_{in}>$, comparator 352 provides ZCD at a high level to controller 380 and the demagnetization phase starts ($I_L$ starts to decrease).

At around 17 μsec, the end of the demagnetization phase ($I_L$=0) occurs, inductor 220 reacts to the changing value of $I_L$ and enters the demagnetization phase. Inductor 220 provides a "ringing" voltage level on its second terminal. In general, to compensate for this ringing effect, integrated circuit power factor controller 260 will delay turning on drive transistor 230 until the voltage from the drain electrode to the source electrode reaches a stable "valley" voltage with a value less than $V_{in}$.

Thus the disclosed integrated circuit power factor controller allows the construction of an off-line power converter with reduced cost. It reduces the pin count to 6 pins while retaining power factor correction and safety features by making use of a multi-function pin that the integrated circuit power factor controller uses to detect overcurrent, overvoltage, and demagnetization status. The off-line power converter replaces a transformer with an inexpensive inductor and generates a voltage to the multi-function pin using a simple resistor divider connected across the drain and source of the drive transistor. When the drive transistor is conductive, the voltage on the multi-function input terminal reflects the amount of current flowing through the drive transistor and the integrated circuit power factor controller uses it to detect an overcurrent condition. When the drive transistor is non-conductive, the voltage on the multi-function input terminal reflects the voltage on the drain of the drive transistor, which is related to the output voltage and the integrated circuit power factor controller uses it to generate a redundant overvoltage protection signal. The integrated circuit power factor controller detects the demagnetization state by determining when the instantaneous voltage on the multi-function terminal exceeds the average voltage.

The above-disclosed subject matter is to be considered illustrative, and not restrictive, and the appended claims are intended to cover all such modifications, enhancements, and other embodiments that fall within the true scope of the claims. For example, in the illustrated embodiment, integrated circuit power factor controller 260 is a 6-pin product, but in other embodiments integrated circuit power factor controller 260 could have a greater or lesser number of pins.

In the illustrated embodiment, conditioning circuit 310 includes switch circuits 320 and 340, and RC circuit 330, but in other embodiments conditioning circuit 310 could include other types of circuits to provide input signals to evaluation circuit 350.

Moreover, evaluation circuit 350 includes comparators 352, 356, 358, and 362, but in other embodiments evaluation circuit 350 could include more or less comparators to provide more or less comparison results to controller 380.

Thus, to the maximum extent allowed by law, the scope of the present invention is to be determined by the broadest permissible interpretation of the following claims and their equivalents, and shall not be restricted or limited by the foregoing detailed description.

What is claimed is:

1. An off-line power converter, comprising:
    integrated circuit power factor controller including:
        a multi-function input terminal, wherein said multi-function input terminal is adapted to receive a voltage representative of a voltage proportional to a current flowing through a drive transistor and upon a voltage produced by a voltage sensing circuit;
        a drive terminal for providing a drive signal to a gate of a drive transistor;
        a processing circuit coupled to said multi-function input terminal and, based on a voltage on said multi-function input terminal, providing at least one current signal representative of a current conducted in the off-line power converter, and at least one voltage signal representative of a voltage provided to a load; and
        a controller for providing said drive signal selectively in response to said at least one current signal and said at least one voltage signal.

2. The off-line power converter of claim 1, wherein said at least one current signal comprises a zero current detection signal, and said processing circuit comprises:
    a resistor having a first terminal coupled to said multi-function input terminal, and a second terminal for providing an average voltage signal;
    a capacitor having a first terminal coupled to said second terminal of said resistor, and a second terminal coupled to a reference voltage terminal; and
    a first comparator having a first input terminal coupled to said multi-function terminal, a second input terminal coupled to said second terminal of said resistor, and an output terminal for providing said zero current detection signal.

3. The off-line power converter of claim 2, wherein said at least one current signal is an overcurrent protection signal, and said processing circuit further comprises:
    a second comparator having a first input terminal coupled to said multi-function terminal, a second input terminal for receiving an overcurrent threshold signal, and an output terminal for providing said overcurrent protection signal.

4. The off-line power converter of claim 3, wherein said processing circuit further comprises:
    a first switch circuit for coupling said multi-function input terminal to said first input terminal of said second comparator when said drive signal is active.

5. The off-line power converter of claim 1, wherein said processing circuit comprises:
    a first comparator having a first input terminal, a second input terminal for receiving a first overvoltage threshold signal, and an output terminal for providing a first overvoltage protection signal; and
    a second switch circuit for coupling said multi-function input terminal to said first input terminal of said first comparator when said drive signal is inactive,
    wherein said controller further has an input terminal for receiving said first overvoltage protection signal, and further provides said drive signal selectively in response to said first overvoltage protection signal.

6. The off-line power converter of claim 5 further comprising a feedback terminal, wherein said processing circuit comprises:
    a second comparator having a first input terminal coupled to said feedback terminal, a second input terminal for receiving a second overvoltage threshold signal, and an output terminal for providing a second overvoltage protection signal,
    wherein said controller further has an input terminal for receiving said second overvoltage protection signal, and further provides said drive signal selectively in response to said second overvoltage protection signal.

7. The off-line power converter of claim 1, wherein said processing circuit comprises:
    a resistor having a first terminal coupled to said multi-function input terminal, and a second terminal for providing an average voltage signal; and
    a capacitor having a first terminal coupled to said second terminal of said resistor, and a second terminal coupled to a reference voltage terminal.

8. The off-line power converter of claim 7, wherein said at least one current signal comprises a zero current detection signal, and said processing circuit further comprises:
    a first comparator having a first input terminal coupled to said multi-function terminal, a second input terminal coupled to said second terminal of said resistor, and an output terminal for providing said zero current detection signal.

9. The off-line power converter of claim 7, wherein said at least one voltage signal comprises a brownout detection signal, and said processing circuit further comprises:
    a second comparator having a first input terminal coupled to said second terminal of said resistor, a second input terminal for receiving a brownout threshold voltage, and an output terminal for providing said brownout detection signal.

10. The off-line power converter of claim 1 wherein:
    the integrated circuit power factor controller is characterized as being a 6-pin chip further comprising a feedback terminal, a control voltage terminal coupled to an output of an error amplifier of the integrated circuit power factor controller, a power supply voltage terminal, and a reference voltage terminal.

11. The off-line power converter of claim 1, further comprising:
    a rectifier having an input for coupling to a power supply mains, and an output for providing a rectified input voltage;
    an inductor having a first terminal coupled to said output of said rectifier, and a second terminal;
    the drive transistor further having a first current electrode coupled to said second terminal of said inductor, and a second current electrode coupled to a reference voltage terminal through a sense resistor; and
    a voltage sensing circuit having a first input terminal coupled to said first current electrode of said drive transistor, a second input terminal coupled to said second current electrode of said drive transistor, and an output terminal coupled to said multi-function input terminal.

12. The off-line power converter of claim 11, wherein said voltage sensing circuit comprises:

a first resistor having a first terminal coupled to said first current electrode of said drive transistor, and a second terminal coupled to said multi-function input terminal; and a second resistor having a first terminal coupled to said multi-function input terminal, and a second terminal coupled to said second current electrode of said drive transistor.

13. The off-line power converter of claim 11, wherein said voltage sensing circuit comprises:

a first resistor having a first terminal coupled to said first current electrode of said drive transistor, and a second terminal coupled to said multi-function input terminal; and a second resistor having a first terminal coupled to said multi-function input terminal, and a second terminal coupled to said second current electrode of said drive transistor;

a first capacitor having a first terminal coupled to said first current electrode of said drive transistor, and a second terminal coupled to said multi-function input terminal; and a second capacitor having a first terminal coupled to said multi-function input terminal, and a second terminal coupled to said second current electrode of said drive transistor.

14. An off-line power converter, comprising:

integrated circuit power factor controller including:

an input terminal;

a drive terminal for providing a drive signal to a gate of a drive transistor;

a first circuit coupled to said input terminal for providing an average voltage signal representative of an average value of a voltage at said input terminal;

a second circuit for comparing said voltage at said input terminal to said average voltage signal to form a zero current detection signal; and a controller for providing said drive signal selectively in response to both said average voltage signal and said zero current detection signal.

15. The off-line power converter of claim 14, wherein said first circuit comprises:

a resistor having a first terminal coupled to said input terminal, and a second terminal for providing said average voltage signal; and a capacitor having a first terminal coupled to said second terminal of said resistor, and a second terminal coupled to a reference voltage terminal.

16. The off-line power converter of claim 14, wherein said first circuit is coupled to said input terminal through a buffer having an input terminal coupled to said input terminal, and an output terminal coupled to said first circuit.

17. The off-line power converter of claim 16, wherein said buffer comprises:

a first resistor having a first terminal coupled to said input terminal, and a second terminal;

a first capacitor having a first terminal coupled to said second terminal of said first resistor, and a second terminal coupled to a reference voltage terminal;

an operational amplifier having a noninverting input coupled to said second terminal of said first resistor, an inverting input, and an output forming said output terminal of said buffer;

a second resistor having a first terminal coupled to said output terminal of said operational amplifier, and a second terminal coupled to said inverting input of said operational amplifier;

a second capacitor having a first terminal coupled to said output terminal of said operational amplifier, and a second terminal coupled to said inverting input of said operational amplifier; and a third capacitor having a first terminal coupled to said inverting input of said operational amplifier, and a second terminal coupled to said reference voltage terminal.

18. An integrated circuit comprising:

a feedback terminal;

an input terminal;

a drive terminal for providing a drive signal to a gate of a drive transistor;

a first comparator having a first terminal coupled to said feedback terminal, a second terminal for receiving a first reference voltage, and an output terminal for providing a first over-voltage protection signal;

a second comparator having a first terminal coupled to said input terminal when said drive signal is inactive, a second terminal for receiving a second reference voltage, and an output terminal for providing a second over-voltage protection signal; and a controller coupled to said drive terminal for selectively activating said drive signal to regulate a voltage on said feedback terminal, and for keeping said drive signal inactive in response to either said first over-voltage protection signal or said second over-voltage protection signal.

19. The integrated circuit of claim 18, further comprising:

a first circuit coupled to said input terminal for providing an average voltage signal proportional to an average value of said input terminal; and a second circuit for comparing said input terminal to said average voltage signal to provide a zero current detection signal, said controller further providing said drive signal selectively in response to both said average voltage signal and said zero current detection signal.

20. The integrated circuit of claim 19, further comprising:

a third comparator having a first terminal for receiving said average voltage signal, a second terminal for receiving a third reference voltage, and an output terminal for providing a brownout signal, wherein said controller keeps said drive signal inactive further in response to said brownout signal.

\* \* \* \* \*